July 5, 1932.   G. E. EWBANK   1,866,020
MAIZE HEADER
Filed Feb. 18, 1930   4 Sheets-Sheet 1
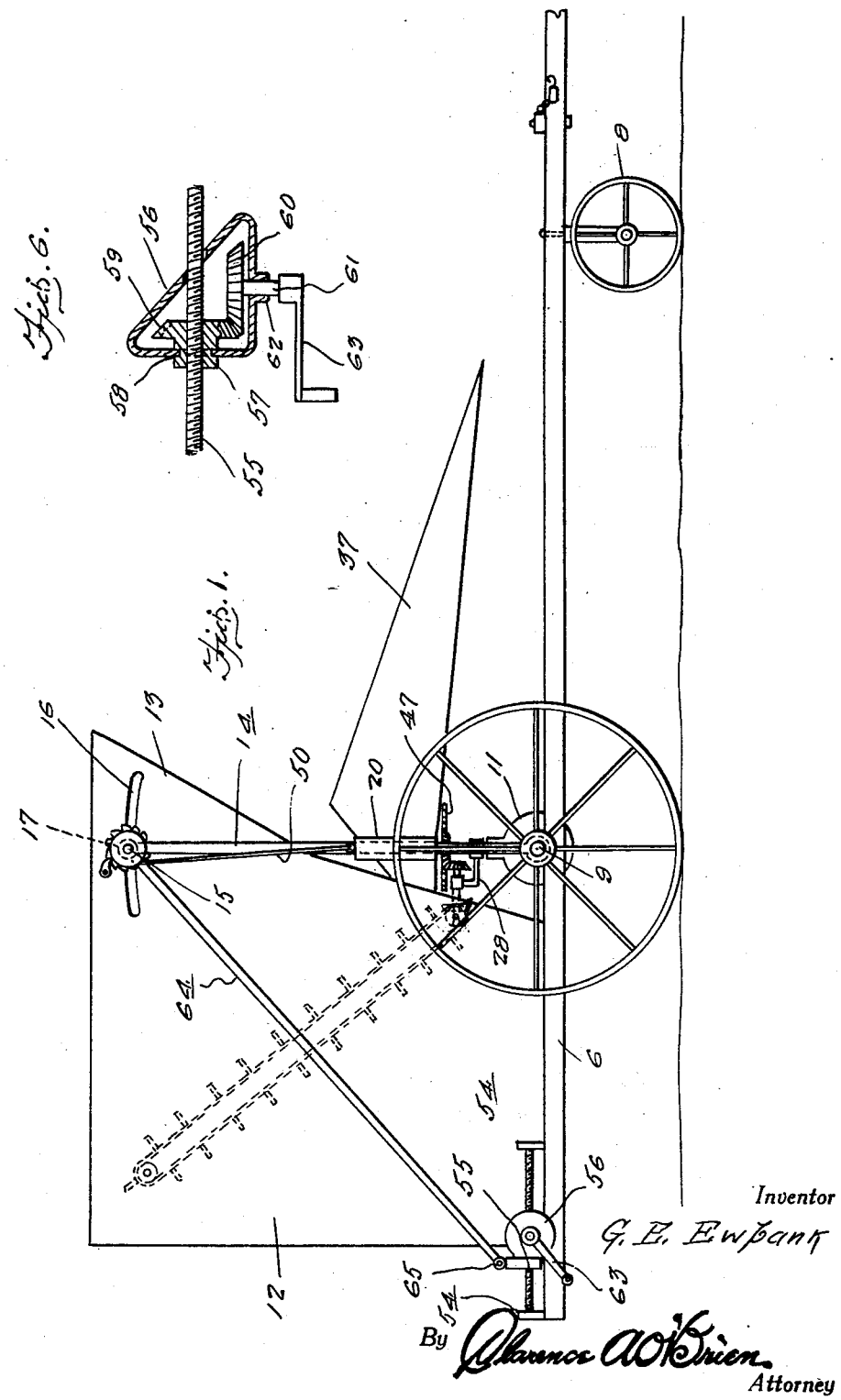
Inventor
G. E. Ewbank
By Clarence A. O'Brien
Attorney

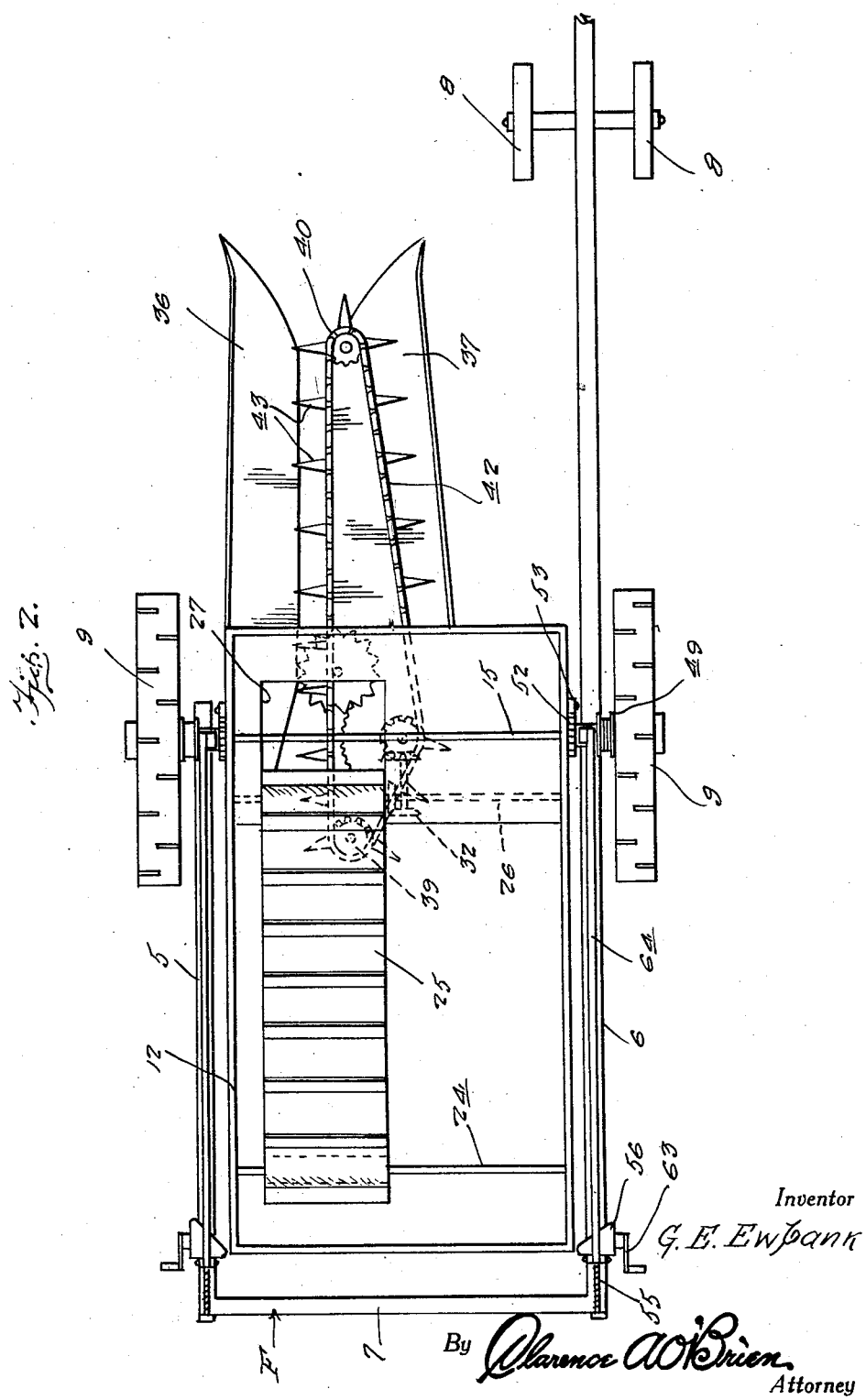

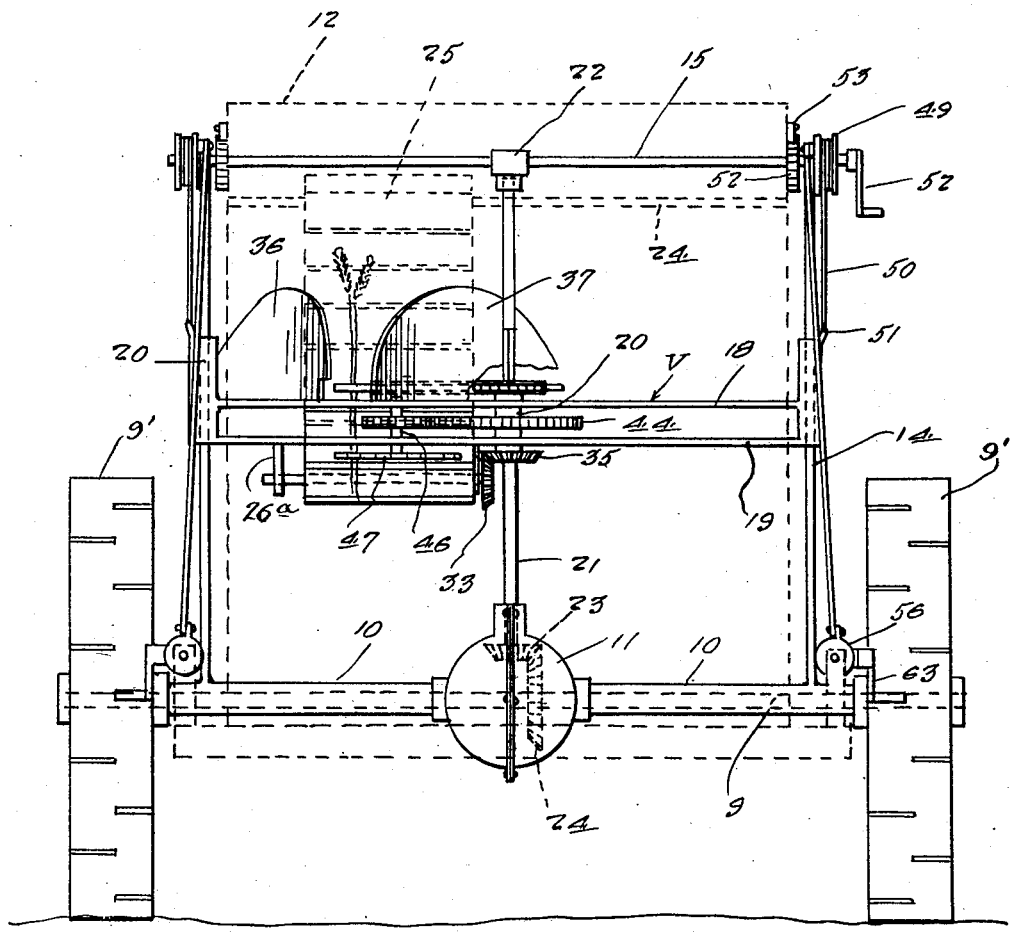

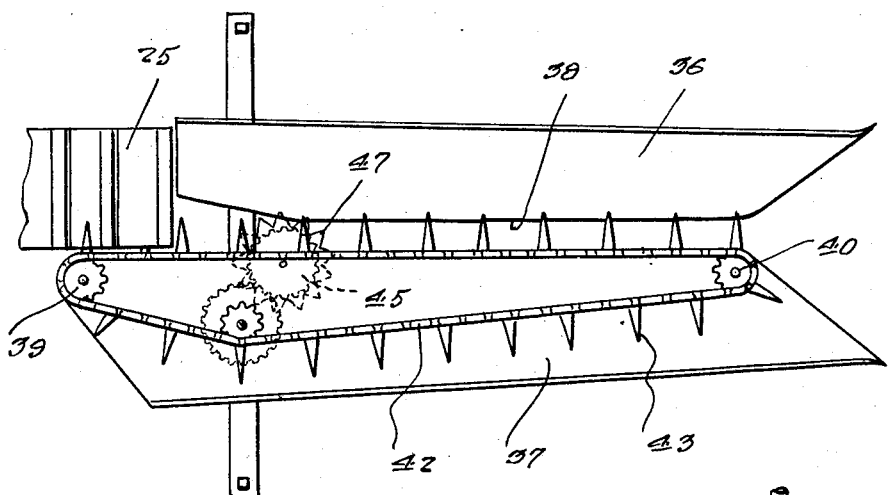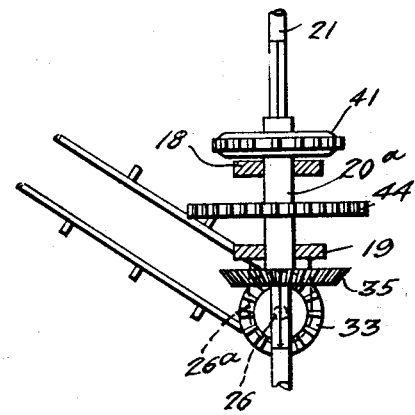

Patented July 5, 1932

1,866,020

UNITED STATES PATENT OFFICE

GENO E. EWBANK, OF DALHART, TEXAS

MAIZE HEADER

Application filed February 18, 1930. Serial No. 429,397.

This invention relates to certain new and useful improvements in a Kaffir or maize header.

A primary object of this invention is to provide a machine for heading Kaffir or maize comprising a wheeled supported frame upon which is mounted a hopper, a cutter mounted on the frame forwardly of the hopper together with suitable mechanism extending forwardly of the cutter for guiding the stalk toward the cutter and an elevator extending into the hopper rearwardly of the cutter for conveying the head of the stalk inwardly of the hopper.

A still further object of the invention is to provide a machine of the above character including suitable means for tilting the cutter and the guide mechanism associated therewith for compensating for the length of the stalks.

A still further object of the invention is to provide a Kaffir or maize header which is comparatively simple in construction, thoroughly reliable and practical and efficient in operation, and otherwise well adapted for the purpose designed.

Other objects and advantages of the invention will become apparent during a study of the following description, taken in connection with the accompanying drawings, wherein:

Figure 1 is a side elevational view of the machine,

Figure 2 is a top plan view thereof,

Figure 3 is a rear end elevational view thereof,

Figure 4 is a fragmentary detail elevational view of the guard and endless drag or guide mechanism associated therewith, Figure 5 is a fragmentary detail view of certain details of construction for more clearly illustrating the intermittent gearing for operating the guide mechanism, cutter and endless conveyor or elevator, Figure 6 is a fragmentary detail view partly in section, and partly in elevation for more clearly disclosing the mechanism for tilting the guard, cutter mechanism and associated parts.

With reference more in detail to the drawings, it will be seen that the invention comprises a substantially U-shaped main frame designated generally by the reference character F and comprising a pair of spaced parallel side bars 5 and 6 respectively and a cross bar 7 connecting the rear end of the side bars 5 and 6.

It is to be noted that the side bar 6 is of a length greater than the length of the side bar 5, and that the same side bar 6 extends forwardly of the machine and has its forward extended end suitably supported on wheels 8. This forward extended end of the side frame bar 6 may be utilized as a draft tongue for the machine. The main frame F is supported on suitable tread wheels 9' journalled on the end of a transverse axle 9.

The axle 9 extends transversely of the frame adjacent the forward end of the side frame bar 5 and intermediate the ends of the side frame bar 6 as clearly disclosed in Figure 2. Axle housing sections are designated by the reference character 10. The axle housing sections 10 extend from opposite sides of a gear casing 11.

Mounted on the frame F rearwardly of the axle housing is a hopper 12 that is open at its top and has the upper forward portion extended forwardly as at 13. The axle housing 10 is rockably mounted on the axle 9 and integral with the housing 10 and rising upwardly therefrom from opposite ends thereof are standards or uprights 14. A horizontal shaft 15 extends transversely of the hopper 12 at the upper forward end thereof and the ends of the shaft 15 are operable in arcuate slots 16 formed in the side walls of the hopper 12 as clearly shown in Figure 1.

The ends of the shaft 15 extends beyond the adjacent sides of the hopper 12, and said ends of the shaft are journalled in suitable bearings 17 formed on the upper ends of the standards 14.

Slidably supported on the uprights 14 is a vertically movable frame designated generally by the reference character V. The frame V comprises upper and lower spaced parallel bars 18 and 19 respectively, that are connected at corresponding ends by vertical sleeves 20 slidable on the uprights 14.

Intermediate the frame B and extending through the upper and lower bars 18 is a rotatable bearing sleeve 20a suitably keyed to the intermediate portion of a vertical rotatable shaft 21. The upper end of the shaft 21 is journaled in a suitable bearing 22 carried by the shaft 15 intermediate the ends of the shaft, and the lower end of the shaft 21 extends into and through the top of the gear housing or casing 11. A beveled gear 23 is formed on the lower inner end of the shaft and meshes with a beveled gear 24 keyed to the axle 9 within the gear housing 11.

Extending transversely of the hopper 12 at the upper rear end is a shaft 24 on which is mounted a suitable roller carrying the upper end of an endless conveyor or elevator 25, the lower end of the elevator 25 embodying a suitable roller mounted on a rotatable shaft 26 journalled in suitable brackets 26a depending from the lower frame bar 19.

The forward wall of the hopper 12 adjacent its lower end and opposite the lower end of the elevator 25 is provided with an intake opening 27. On one end thereof, the shaft 26 is provided with a gear 33 in mesh with a gear 35 on the lower end of sleeve 20.

Extending forwardly from, and carried by the frame B, are a pair of elongated guard fingers 36 and 37 respectively. As shown in Figure 4, the guard finger 36 extends forwardly from the elevator 25 while the guard finger 37 at its rear end extends rearwardly and to one side of the lower end of the elevator 25.

The guard fingers 36 and 37 are similar in construction to the ordinary corn binder fingers, and as shown, the guard fingers 36 and 37 converge toward each other at the lower longitudinal edges, said lower longitudinal edges terminating in spaced parallelism to provide therebetween what may be termed a carry up slot or channel designated by the reference character 38.

Sprockets 39 and 40 respectively are journalled on a vertical axis at the forward and rear end respectively of the guard finger 37 while a third sprocket 41 is provided on the upper end of the sleeve 20a. An endless chain 42 is trained over the sprockets 39, 40 and 41, and carried by the chain and projecting therefrom are guide fingers 43.

As shown to advantage in Figure 4, the guide fingers 43 are adapted to bridge the carry up channel or space between the guard fingers 36 and 37. As shown to advantage in Figure 3, a relatively large gear wheel 44 is fixed to the sleeve 20a intermediate the upper and lower frame bars 18 and 19 and the gear 44 is in mesh with a gear 45 on a vertical shaft 46 suitably journalled on the guard finger 37. The shaft 46 is disposed adjacent the lower longitudinal edge of the guard finger 37 slightly forwardly of the frame V. On the lower end of the shaft 46 is a rotary saw or cutter 47. The blades of the cutter 47 project into the space between the fingers 36 and 37, and as shown to advantage in Figure 3, will cut the heads from the stalks and the cut heads will then be guided on to the lower end of the elevator 25 to be carried upwardly and rearwardly thereby and finally deposited in the hopper 12.

From the foregoing then it will be seen that as the machine is drawn over the ground, the guard fingers 36 and 37 will straddle a row of stalks and the individual stalk will be contacted with by the fingers 43 during the travel of the chain 42 in the direction of the arrow shown in Figure 4, one run of the chain being substantially paralled to the lower longitudinal edge of the guard finger 37 so that the fingers 43 will bridge the space 48 for contact with the stalks thus maintaining the stalks in an upright position to be cut by the cutter 47.

Manifestly, the chain 42, cutter 47, and elevator 25 will be simultaneously actuated during travel of the machine over the ground. This simultaneous operation is effected as follows:

The vertical shaft 21 is rotated through the medium of the intermeshing gears 23 and 24 from the axle 9 whereby rotation is imparted to the shaft 23 for actuating the elevator in the direction shown by the arrow in Figure 5 through the intermeshing of the gears 33 and 35, while obviously the chain 42 is actuated through the rotation of the sprocket 41 on shaft 21 while lastly rotation is imparted to the cutter 47 through the intermeshing of the gears 44 and 45.

Upon each end of the shaft 15 for rotation therewith is a pulley 49 over which is trained a flexible cable 50, one end of the cable being secured as at 51 to the upper end of an adjacent sleeve 20, so that obviously by rotating the shaft 15 manually through the medium of a suitable handle 52 on the end of the shaft, the sleeves 20 may be moved longitudinally of the uprights 14 in order to maintain the frame V in any predetermined distance above the ground. To prevent casual rotation of the shaft 15 there is provided on each end of the shaft a ratchet wheel 52 engageable by a dog 53 pivoted on the side of the hopper 12 as clearly suggested in Figures 1 and 2.

Manifestly this raising and lowering of the frame V will permit of the cutter 47 and the chain 42 carrying the fingers 43 with the guard fingers 36 and 37 arranged in any predetermined distance above the ground as will be required by the length of the stalk.

At the rear end of each of the frame bars 5 and 6 is mounted a pair of spaced apart bearings 54 and a screw shaft threaded throughout its length has its ends journaled within these bearings, the shaft being designated by the reference character 55. Longitudinally movable of the shaft 55 is a casing 56. A nut 57 is threaded on the shaft 55, and this nut 57 is provided with an external annular groove 58 for rotative interlocking engagement with one wall of the housing 56.

On its inner end the nut 57 has formed integral therewith a beveled gear 59 meshing with a beveled gear 60 on the inner end of a shaft 61 journalled in a bearing 62 on an adjacent side wall of the housing 56 as clearly disclosed in Figure 6. On its outer end the shaft 61 is provided with a suitable handle 63.

Actuating rods or links 64 at their upper ends are provided with eyes for receiving the end of the shaft 15, and at their lower ends the links 64 are pivoted to the housing 56 as at 65.

Manifestly by rotating the shaft through the intermeshing of the gears 59 and 60 the housing 56 will be moved any predetermined distance longitudinally of the shaft 55 whereby the upright 14 will be disposed at any suitable desired angle thus positioning the guard fingers 36 and 37, the chain 42 carrying the fingers 43, and the cutter 47 at any desired inclination as may be desired in heading the stalks.

It is thought that from the foregoing description, taken in connection with the accompanying drawings, a clear understanding of the operation, construction, utility and advantages of an invention of this character will be had by those skilled in the art without a more detailed description.

Even though I have herein shown and described the preferred embodiment of my invention, it is to be understood that the same is susceptible to changes fully comprehended by the spirit of the invention as herein described, and the scope of the appended claims.

Having thus described my invention, what I claim as new is:

1. In a device of the character described, a hopper, an inclined elevator mounted in the hopper, and having one end thereof extending through an opening provided in the wall of the hopper, a movably mounted supporting frame, means for supporting the last referred to end elevator on said frame, and means for securing the frame at a desired angular adjustment relative to the perpendicular.

2. In a device of the character described, a pair of pivotally mounted relatively spaced uprights, a frame slidably supported between said uprights, an endless conveyor, means for supporting one end of the conveyor, means on said frame for supporting the other end of the conveyor, a rotatably mounted shaft, a bearing sleeve on said frame in which said shaft is journalled, means for transmitting movement of the shaft to the endless conveyor, means for securing said frame at the desired adjustment relative to the uprights, and means for securing said uprights at the desired angular adjustment relative to the perpendicular.

3. In a device of the character described, a frame, uprights for slidably supporting the frame, means for swinging said uprights on a horizontal axis, a pair of guard fingers carried by said frame and projecting therefrom, gathering chains on said guard fingers, a cutter mounted on one of said guard fingers adjacent one end thereof, a bearing sleeve pivotally mounted in said frame, a rotatable shaft journalled in the bearing sleeve, means for transmitting movement from said shaft to said chains and cutters, driving means for said shaft, and means for securing said frame at the desired adjustment relative to the ground, and relative to the perpendicular respectively.

4. In a device of the character described, gathering mechanism, an endless conveyor, means for mounting one end of the conveyor providing a pivot for the conveyor, a vertically movable member, means for mounting the other end of said conveyor on said vertically movable member, means for mounting said gathering mechanism on said movable member, means for raising and lowering said movable member, supporting means for said movable member, and comprising a pair of spaced apart uprights, means for mounting said uprights for swinging movement relative to the perpendicular, and means for securing said uprights at the desired angular adjustment relative to the perpendicular.

In testimony whereof I affix my signature.

GENO E. EWBANK.